United States Patent
Freeman et al.

(10) Patent No.: US 6,301,462 B1
(45) Date of Patent: Oct. 9, 2001

(54) ONLINE COLLABORATIVE APPRENTICESHIP

(75) Inventors: Brian M. Freeman, Short Hills, NJ (US); Maximilian A. Grant; Edwin Eisendrath, both of Chicago, IL (US); Andrew M. Rosenfield, Lake Forest, IL (US); Enio Ohmaye; Patrick Keating, both of Highland Park, IL (US)

(73) Assignee: UNEXT. COM, Deerfield, IL (US)

( * ) Notice: Subject to any disclaimer, the term of this patent is extended or adjusted under 35 U.S.C. 154(b) by 0 days.

(21) Appl. No.: 09/344,659

(22) Filed: Jun. 25, 1999

Related U.S. Application Data

(60) Provisional application No. 60/116,120, filed on Jan. 15, 1999.

(51) Int. Cl.[7] .................................................. G09B 3/00
(52) U.S. Cl. ...................... 434/350; 322/323; 322/362; 322/118
(58) Field of Search ..................................... 434/350, 322, 434/323, 362, 118

(56) References Cited

U.S. PATENT DOCUMENTS

| | | | |
|---|---|---|---|
| 5,002,491 | * | 3/1991 | Abrahamson et al. .......... 434/322 X |
| 5,395,243 | * | 3/1995 | Lubin et al. ..................... 434/118 X |
| 5,597,312 | * | 1/1997 | Bloom et al. .................... 434/362 X |
| 5,904,485 | * | 5/1999 | Siefert ............................. 434/322 X |
| 6,014,134 | * | 1/2000 | Bell et al. ........................ 345/329 X |
| 6,029,043 | * | 2/2000 | Ho et al. ......................... 434/350 X |
| 6,039,575 | * | 3/2000 | L'Allier .......................... 434/323 X |
| 6,146,148 | * | 11/2000 | Stuppy ............................ 434/322 X |
| 6,149,441 | * | 11/2000 | Pelligrino et al. .............. 434/350 X |
| 6,157,808 | * | 12/2000 | Hollingsworth ................ 434/350 X |
| 6,162,060 | * | 12/2000 | Richard et al. ................. 434/118 X |
| 6,201,948 | * | 3/2001 | Cook et al. ..................... 434/350 X |

\* cited by examiner

*Primary Examiner*—Valencia Martin-Wallace
*Assistant Examiner*—Chanda Harris
(74) *Attorney, Agent, or Firm*—Joseph Levi, Esq.; Joseph P. Kincart, Esq.; Clifford Chance Rogers & Wells LLP

(57) ABSTRACT

A collaborative learning system and method for implementing innovative criteria fashioned into an electronic learning experience that can be utilized at great distances. Learners can participate in the learning experience asynchronously thereby taking advantage of diverse schedules. A system is provided for offering network based education including software running on a computer or a plurality of computers for delivering educational services online. The network can include an internet protocol network wherein the servers can be accessed via a WEB interface. Software operative with a processor can cause an adaptive assessment tracking the learning style and progress of an individual learner. The system can also be responsive to an online assessment with remediation and guidance. Lessons, implemented by executable software code can be designed to challenge a learner with ever increasing sophisticated levels of encounter and interaction until the learner reaches their limit of knowledge and is forced to acquire additional skills.

22 Claims, 5 Drawing Sheets

ONLINE COLLABORATIVE APPRENTICESHIP

CROSS REFERENCE TO RELATED APPLICATIONS

This application claims the benefit of provisional application entitled "Virtual University," filed Jan. 15, 1999, bearing the Ser. No. 60/116,120, the contents of which are relied upon and incorporated by reference.

BACKGROUND

This invention comprises a software learning engine offered online via a network of multimedia nodes. The learning engine can provide an educational experience wherein, interactive lessons are utilized and content is designed in cooperation and partnership with academic institutions. Course content can include building blocks of knowledge and be delivered using multiple vehicles. Degrees are granted entirely through online courses. University functions such as registration, administrative tasks, and purchasing course materials are also accomplished online.

Traditional campus based universities are limited by their physical resources in the number of learners to whom they can market their intellectual property. Classroom and campus constraints dictate a relatively small consumer base embodied as learners.

In addition, fixed schedules, passive learning and an academic school year have limited traditional education models utilizing a physical campus with one teacher and many learners. One limitation of the prevailing model is manifested by it primarily being available only to people during the first stages of their life.

Known methods of offering distance learning have not been able to harness the teaching techniques and material of first tier higher education institutions. Existing methods generally require that a learner become self taught with periodic assessments by the distance learning institution.

There is a need for an educational forum that provides interactive lessons asynchronously such that a learner can participate in a lesson using an on demand schedule and also reap the benefits of an interactive learning environment. A learner should not be bound by geographical constraints. Preferably the educational forum would provide accredited courses and curriculums leading to a degree being granted. Other desirable embodiments can include learning modules directed to a specific need of a customer, for example, a corporation desiring internal education.

SUMMARY

Accordingly, the present invention provides a collaborative learning system and method for implementing innovative criteria fashioned into an electronic learning experience that can be utilized at great distance. Learners can participate in the learning experience asynchronously thereby taking advantage of diverse schedules.

In one aspect, the current invention provides a system for offering online WEB based education. In another aspect, the invention includes software running on a computer or a plurality of computers for delivering educational services online. The software can perform an adaptive assessment following the learning style and progress of an individual learner. The system can be responsive to an assessment with remediation and guidance. In one embodiment, the system can be accessed via a WEB interface.

Lessons implemented by executable code can be designed to challenge a learner with ever increasing sophisticated levels of encounter and interaction until the learner reaches their limit of knowledge and is forced to acquire additional skills.

In a preferred embodiment, the software is developed in modules to allow continuous updating and customization. Optionally, modules can be used in multiple learning courses. In one aspect of the invention, real time team exercises can be used to facilitate learners working collectively and cooperatively to perform projects. Team members or learners can participate from separate facilities.

In one aspect, the invention includes a computer communications system. The system can deliver, track progression of, assess work product relating to and certify completion of educational modules accessed by a learner. The system can include a computer communications network with a computer server and a network access device, each containing a processor, a storage medium, and a display and being connected to the computer network. Executable software can be stored on the server storage medium and executed on demand via a network access device. The software operative with the processors can cause a module included in a learning engine to display on the network access device. The module can include a means for motivating the learner relating to subject matter contained in an educational module, a means for selecting an element of subject matter comprising the educational matter, a means for facilitating understanding of the element of subject matter by the learner, a means for performing a task online by the learner, a means for evaluating the performance of the task performed online, a means responsive to the evaluation of performance, for explaining an aspect of the subject matter of the element, a means for assessing a learner's comprehension of subject matter presented in the module, and a means for certifying satisfactory comprehension of the subject matter presented in the learning engine.

In one embodiment, the task can include forming a lab team to role play a situation relating to the module subject matter. In another, the motivation means includes a multimedia segment of an expert detailing an actual scenario relating to the module subject matter. Interactive multimedia presentations can also be utilized in modules and students can be required to submit work products including online cognitive artifact.

In another aspect, the invention can include adaptive assessment and learning software. The adaptive assessment and learning software can track the number of attempts a learner makes to satisfactorily complete a task and branch to an alternative learning module when a threshold number of attempts is reached. It can also be utilized to track the amount of time that transpires during which a learner accesses a module and branch to an alternative learning module when a threshold amount of time has been reached.

In still another aspect, the present invention includes a method of interacting with a computer communications network so as to provide instruction to a learner. A learner can access a server with a network access device over the computer communications network and execute a software program comprising a learning engine wherein the learning engine can cause an education module to be presented to the learner. A learner may interact with the network access device such that the module will present motivational material to the learner and facilitate understanding of the subject matter. The software can also permit the learner to perform a task online and evaluate the online task, responding to frequently made mistakes. It can also assess the learner's comprehension of the subject matter and certify satisfactory comprehension of the module.

This invention can also embody a computer system, a programmed computer, a computer program residing on a computer-readable medium, a computer data signal or a method of interacting with a computer and embodying the concepts described above.

The details of one or more embodiments of the invention are set forth in the accompanying drawings and the description below. Implementations can provide advantages such as the capability to leverage intellectual capital and provide learning modules online. Other features, objects, and advantages of the invention will be apparent from the description, the drawings and the claims.

DETAILED DESCRIPTION

Figure 1:
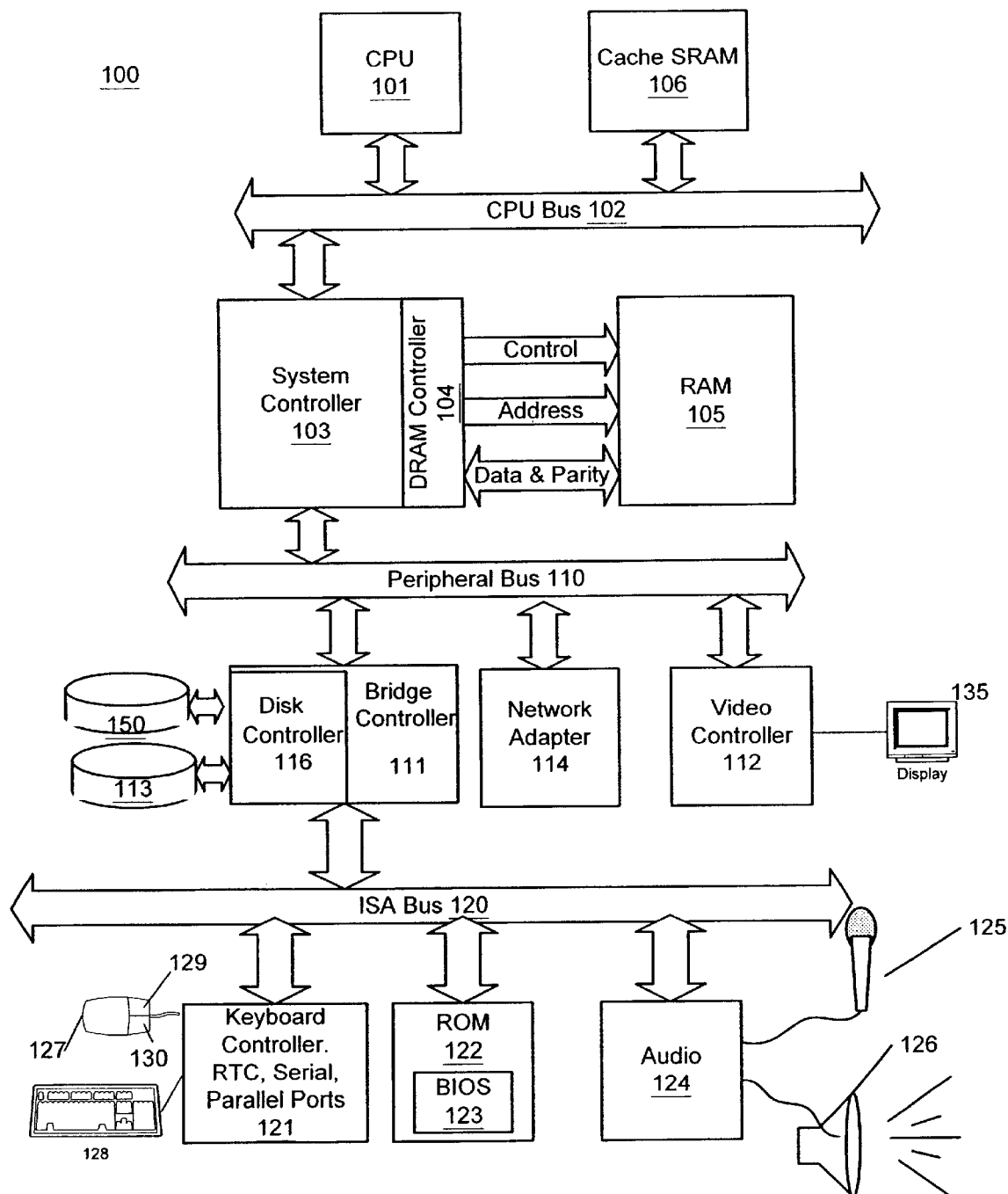
FIG. 1 is a description of a computer.

Referring to FIG. 1, physical resources of a computer system 100 are depicted. The computer 100 has a central processor 101 connected to a processor host bus 102 over which it provides data, address and control signals. The processors 101 may be any conventional general-purpose single-chip or multi-chip microprocessor such as a Pentium® series processor, a K6 processor, a MIPS® processor, a Power PC® processor or an ALPHA® processor. In addition, the processor 101 may be any conventional special purpose microprocessor such as a digital signal processor or a graphics processor. The microprocessor 101 can have conventional address, data, and control lines coupling it to a processor host bus 102.

The computer 100 can include a system controller 103 having an integrated RAM memory controller 104. The system controller 103 can be connected to the host bus 102 and provide an interface to random access memory 105. The system controller 103 can also provide host bus to peripheral bus bridging functions. The controller 103 can thereby permit signals on the processor host bus 102 to be compatibly exchanged with signals on a primary peripheral bus 110. The peripheral bus 110 may be, for example, a Peripheral Component Interconnect (PCI) bus, an Industry Standard Architecture (ISA) bus, or an Extended Industry Standard Architecture (EISA) bus. Additionally, the controller 103 can provide data buffering and data transfer rate matching between the host bus 102 and peripheral bus 110. The controller 103 can thereby allow, for example, a processor 101 having a 64-bit 66 MHz interface and a 533 Mbytes/second data transfer rate to interface to a PCI bus 110 having a data path differing in data path bit width, clock speed, or data transfer rate.

Accessory devices including, for example, a video display controller 112 and network controller 114 can be coupled to the peripheral bus 110. The network controller 114 may be a modem, an Ethernet networking card, a cable modem, or other network access device. The system 100 may also include a secondary peripheral bus 120 coupled to the primary peripheral bus 110 through a bridge controller 111. The secondary peripheral bus 120 can be included in the system 100 to provide additional peripheral device connection points or to connect peripheral devices that are not compatible with the primary peripheral bus 110. For example, in the system 100, the secondary bus 120 may be an ISA bus and the primary bus 110 may be a PCI bus. Such a configuration allows ISA devices to be coupled to the ISA bus 120 and PCI devices to be coupled to the PCI bus 110. The bridge controller 111 can also include a hard disk drive control interface to couple a hard disk 113 to the peripheral bus 110.

The computer 100 can also include non-volatile ROM memory 122 to store basic computer software routines. ROM 122 may include alterable memory, such as EEPROM (Electronically Erasable Programmable Read Only Memory), to store configuration data. For example, EEPROM memory may be used to store hard disk 113 geometry and configuration data. BIOS routines 123 are included in ROM 122 and provide basic computer initialization, systems testing, and input/output (I/O) services. For example, BIOS routines 123 may be executed by the processor 101 to process interrupts that occur when the bridge 111 attempts to transfer data from the ISA bus 120 to the host bus 102 via the bridge 111, peripheral bus 110, and system controller 103. The BIOS 123 also includes routines that allow an operating system to be "booted" from the disk 113 or from a server computer using a local area network connection provided by the network adapter 114.

An operating system may be fully loaded in the RAM memory 105 or may include portions in RAM memory 105, disk drive storage 113, or storage at a network location. An operating system, can provide functionality to control computer peripherals and to execute user applications. Examples of high-level operating systems are, the Microsoft Windows 98™, Windows NT™, a UNIX™ operating system, the Apple MacOS™ operating system, or other operating system. The operating system can provide functionality to execute software applications 150, software systems and tools of software systems. Software functionality can access the video display controller 112 and other resources of the computer system 100 to provide educational modules on a computer screen and through other multimedia aspects of the computer 100. User applications 150 may be commercially available software programs such as a collaborative apprenticeship software, word processor, spreadsheet, database, internet access software and many other types of software.

Figure 2:
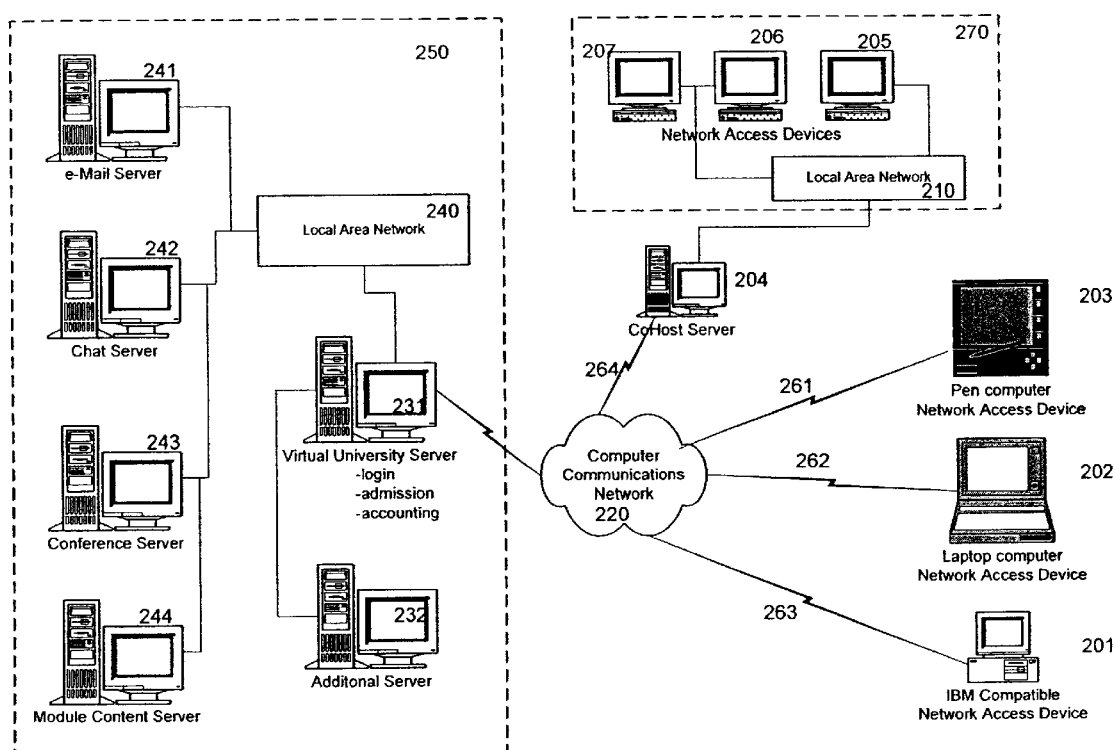
FIG. 2 illustrates a computer communications network according to this invention.

Referring now to FIG. 2, a collection of computers 100 can serve as components of a computer network 200. A computer network 200 can include a host computer system 250 and client computers 201–207. The client computers 201–207 can communicate with the host 250 to obtain data stored at the host 250 on servers 241–244. The client computer 201–207 may interact with the host computer 250 as if the host was a single entity in the network 200. However, the host 250 may include multiple processing and database sub-systems that can be geographically dispersed throughout the network 200.

In addition, client computers may include a tightly coupled cluster 205–207 of computers 100 at a first location that access data systems 241–244 at remote locations. Each data system 241–244 may include additional processing components.

Client computers 201–207 can communicate with the host system 250 over wired or wireless mediums, for example, a private network or a combination of public switched telephone network dial-up connections and packet network interconnections. For example, client computers 201–203 may each include a modem coupled to voiceband telephone line 261–263. To communicate with the host 250, the client computers 201–203 establish a data connection with a local terminal server 225 by dialing a telephone number assigned to the local terminal server 225. A local terminal server 225 may have both dial-up and packet network interfaces allowing the server 225 to receive data from client computers 201–203, segment the received data into data packet payload segments, add overhead information to the payload segments, and send the resultant data packets over a link 221 to a packet data network 220 for delivery to the host system 250. Terminal servers 231 and 232 may also be referred to as a network service provider's point-of-presence (POP).

The overhead information added to the payload segments include a packet header. A packet header can include a destination address assigned to the host system 250 and a source address assigned to a local terminal server 231. Other overhead information may include information associating the data packet with a specific client 201–203. Similarly, the host system 250 may send data to a client 201–203 by segmenting the data into data packet payload segments, and adding overhead information to send the data packet to a client 201–203 at the terminal server 225. Client computers 205–207 may similarly exchange data with the host 250 over communications link 264 to terminal server 231.

Data packet formats, switching equipment within the network 220, and networking protocols used within the network 220 may conform to the transmission control protocol/internet protocol (TCP/IP). In a TCP/IP implementation, the host 250, packet network terminal server 231 is assigned a unique internet protocol (IP) network address. TCP/IP switching equipment within the network 220 can direct a TCP/IP packet to an intended recipient based on the packet's destination IP address. Implementations may use other networking protocols and packet formats.

In one embodiment of the present invention a "co-host" server 204 is utilized to provide more expedient responses. In a co-host environment 270, a server 204 or cluster of servers can be connected to a local area network (LAN) 210 to serve course content and provide services such as e-mail, chat sessions, conferences, course content, accounting, admissions and login. An in-house connection to the LAN can provide greater speed and reliability in delivery of server content to a workstation.

Client workstations 201–207 can comprise a computer as described above or another WEB access device that adhere to a protocol such as the Internet protocol. Other examples can include TV WEB browsers, terminals, and wireless access devices. Preferably an access device comprises a display capability, an input device and an electronic storage.

In addition to WEB access to the course content it is possible to download onto a personal computer or other electronic device the interactive material so that the lesson modules can be conducted off-line.

Figure 3:
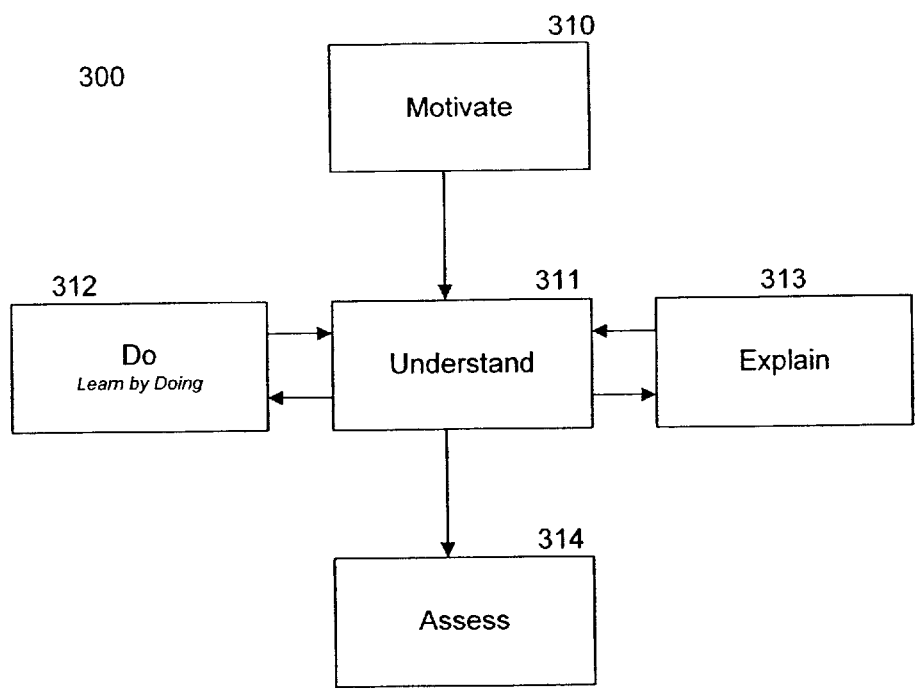
FIG. 3 illustrates the flow of a teaching proceed utilized in this invention.

Referring now to FIG. 3, a flow of a teaching process 300 which can be implemented via a communications network is illustrated. The teaching process 300 can commence with a motivational sequence 310 explaining why the material about to be encountered is important to the learner. A typical motivational segment may include a Chief Executive Officer of a well known corporation, or other recognized expert, detailing an actual scenario that occurred wherein the subject matter about to be presented was significant. Online collaborative apprenticeship can allow for motivational sequences to be presented with on demand video streams such that the learner can return to the motivational segments whenever it seems appropriate to be reminded of their content. In addition this invention can incorporate one or more experts relating multiple experiences, wherein the experiences incorporate diverse scenarios. Viewing video streams or reading text relating multiple experiences can be optional to the learner such that the learner can better relate to motivational material meaningful to their life situation.

Following motivation 310, a learner can enter an online learning stage including understanding material 311, doing exercises and labs 312, and explaining relevant subject matter 313. The online collaborative apprenticeship allows for innovative learning criterion to be actualized via a communications network.

An "understand" 311 or teaching module can include case studies, simulations, exercises, essays, formal reading, video clips, audio file lectures and other knowledge transfer mediums.

Learn by doing online modules 312 can present learners with tasks to enhance the acquisition of skills and knowledge. Tasks can include problem solving, constructive activities such as building a business case and other cognitive artifacts. Collaborative online apprenticeship provides access to tools for permitting each learner to accomplish the goal of a learning exercise in a way most productive to that particular learner. Online research, online experts and online text books can be searched and utilized as reference material.

Learn by doing experiences 312 can also include elements that simulate situations in which a learner must make a choice. Consequences of a selected choice can be subsequently presented via the communications network. A learner can receive supporting material facilitating the "Explain" stage 313. Explaining 313 can enable a learner to conduct research and repeat the process by making another choice. In addition a collaborative apprenticeship can be programmed to recognize frequently misunderstood concepts. Interactive presentations, including animations, video streams or other multimedia mediums, can automatically respond to a learner selection indicative of a frequently misunderstood concept with an on target explanation responsive to a wrong choice. Other responses to frequently misunderstood concepts can include directed text readings and audio segments.

Learn by doing 312 activities can also include forming a lab team for role playing a situation relating to module subject matter. For example, a lab can be organized such that one learner plays the role of financial manager, another a marketing guide, another a product manager, another a general manager, and so on. The team may be given a task such as bringing a product to market. As a team, the learners can conduct structured activities or engage in competition with other teams. A lab team can also create inter-team and intra-team discussions. During each role a learner can be encouraged to further solidify their knowledge by articulating what they have learned. Articulation can be accomplished in the form of e-mail, documents serving as work product, telephone conference calls, video conference or other forms of technology assisted communications.

Referring again to FIG. 3, a learning module can culminate in an assessment 314 of the learners acquired knowledge. Assessment 314 can be accomplished via submission of cognitive artifacts or online through exam administration. Exams can be accomplished in a proctored environment to assure compliance with the providers standards. Cognitive artifacts can be submitted to a learner's peers or online university staff.

Figure 4:
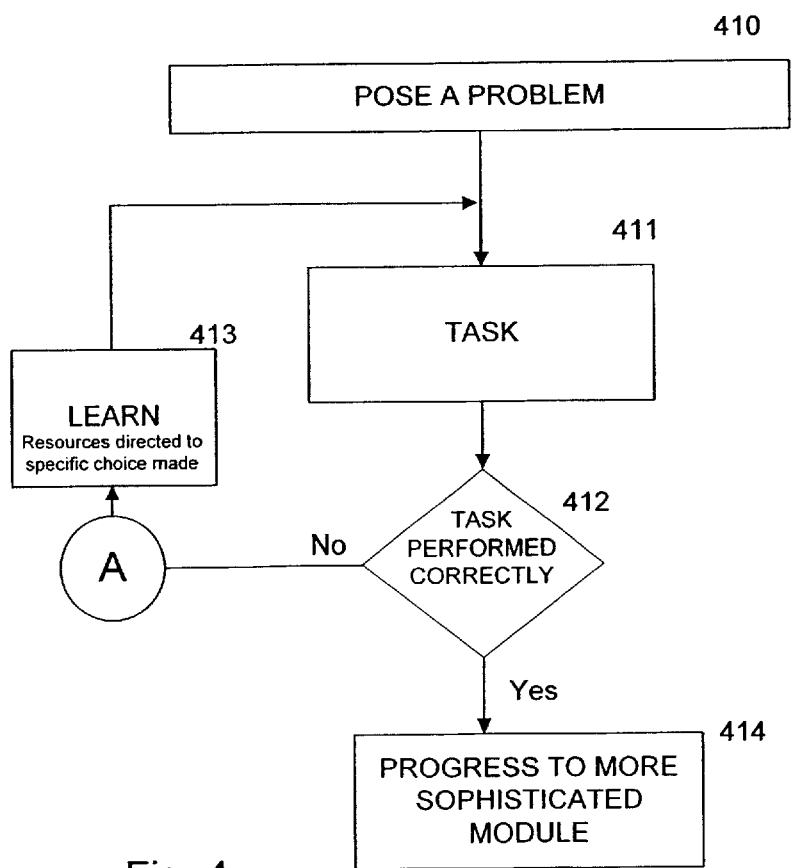
FIG. 4 illustrates the flow of a learning routine utilized by this invention.

Referring now to FIG. 4, an online collaborative apprenticeship system can allow an individual learner to progress at a rate attributable to that learner. A learner can encounter material to be learned in diverse ways and be allowed to set a path that takes advantage of each learner's particular knowledge and learning experience. Therefore, a learner may choose a path that is unique thereby exposing him to drills tailored to a learners individual needs. The system can pose a problem 410 to a learner and require that a task, or multiple tasks, relating to the problem be accomplished by the learner. As a learner performs a task correctly 412, the learner can progress 414. A task performed incorrectly can direct a learner to additional materials to facilitate learning 413. After additional learning, the system can then allow the learner to resume with the task stage and ascertain their understanding of the material 420.

Utilizing online collaborative apprenticeship, a learner can progress quickly over material familiar to them and drill deeply into material that is unknown, and therefore more important, to that learner. Two learners who encounter equivalent course material, such that in the end it requires competence using a similar set of skills, may acquire those skills via different learning patterns.

In one embodiment, an online framework executing a learning engine can be programmed to make a wrong choice seem more attractive thereby directing a learner to a resource that would otherwise remain unaccessed. Resources can include, for example, an expert from the field being addressed that appears in video mode and explains why a particular choice is wrong. If possible, the expert can illustrate conceivable consequences a choice would present with actual case histories.

Figure 5:
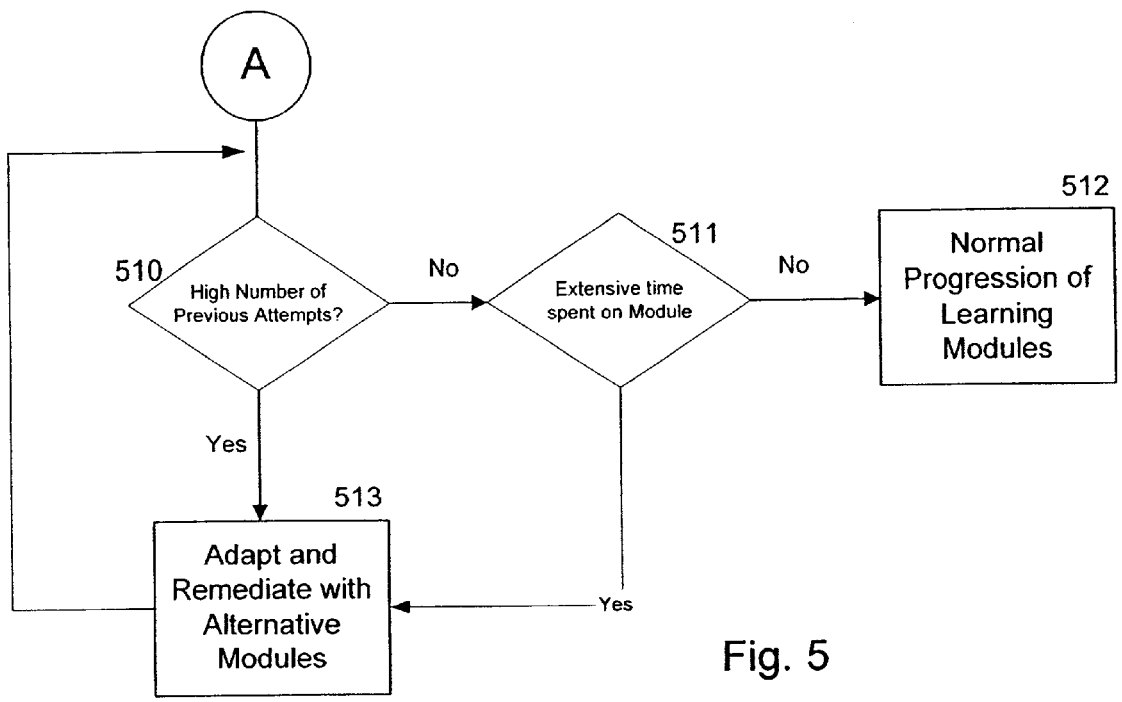
FIG. 5 illustrates the flow of adaptive remediation.

Referring now to FIG. 5, the present invention can provide adaptive learning and adaptive assessment. Following a task performed incorrectly 411, the system can utilize responsive software that has the ability to follow each individual learner's learning style and progress. The software can track a number of failed attempts to complete a task 510 and the amount of time spent on a particular task 511. When a threshold number of attempts or expired time has been reached, the software can adapt and remediate 513 with alternative modules. The alternative modules can be designed to guide a learner based on a learner's capabilities.

This invention can also utilize a technique for imparting learning through forced failure. The software can be designed to challenge a learner with increasingly sophisticated levels of encounter and interaction until a learner reaches their limit of knowledge and performs a task incorrectly 412. The learner can be forced to require additional skills through learning. Adaptive assessment 314 works in a similar way to move learners quickly through what they already know and to force them to acquire specific skills before they can move on.

Figure 6:
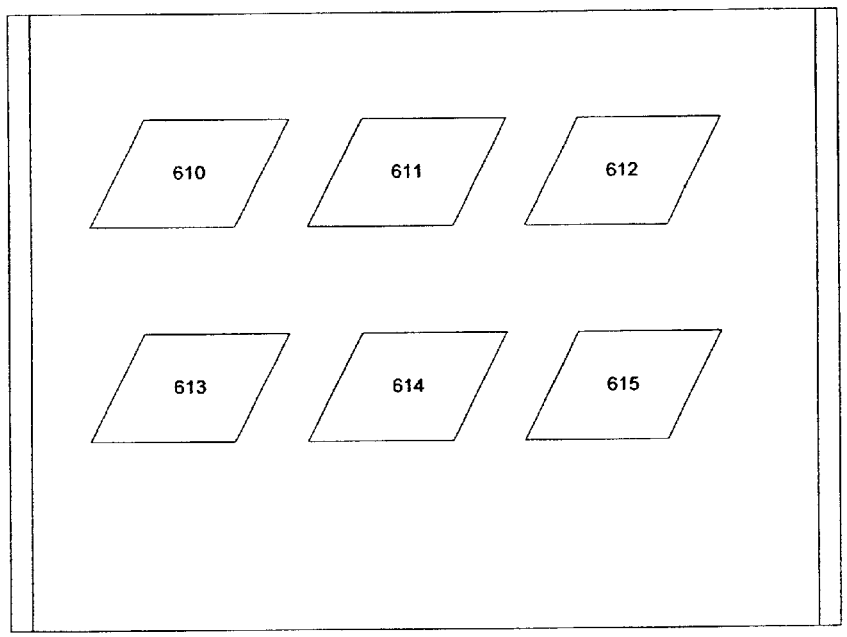
FIG. 6 illustrates the relationship between knowledge elements and software modules.

Online collaborative apprenticeship can be accomplished through asynchronous learning. Asynchronous learning allows a learner to access a course at a time convenient to the learner. It relieves a learner of scheduling conflicts often inherent in traditional learning institutions. Referring now to FIG. 6, asynchronous learning is facilitated with the use of software modules 600 implementing online collaborative apprenticeship. The software modules can be based upon building blocks of knowledge, or knowledge elements 610–615. Elements can relate to different aspects of subject matter that make up a module. The use of modules can allow a breaking of linearity that is often associated with traditional instructor lead courses. Element 610–615 can be located, experienced, referenced, and refreshed online, by a learner. Tools used to convey knowledge elements can include video clips, audio clips, simulations, animated concepts, multimedia presentations and passive illustrations.

Asynchronous learning allows a learner to select an engine and operate that engine at a time convenient to the learner.

Figure 7:
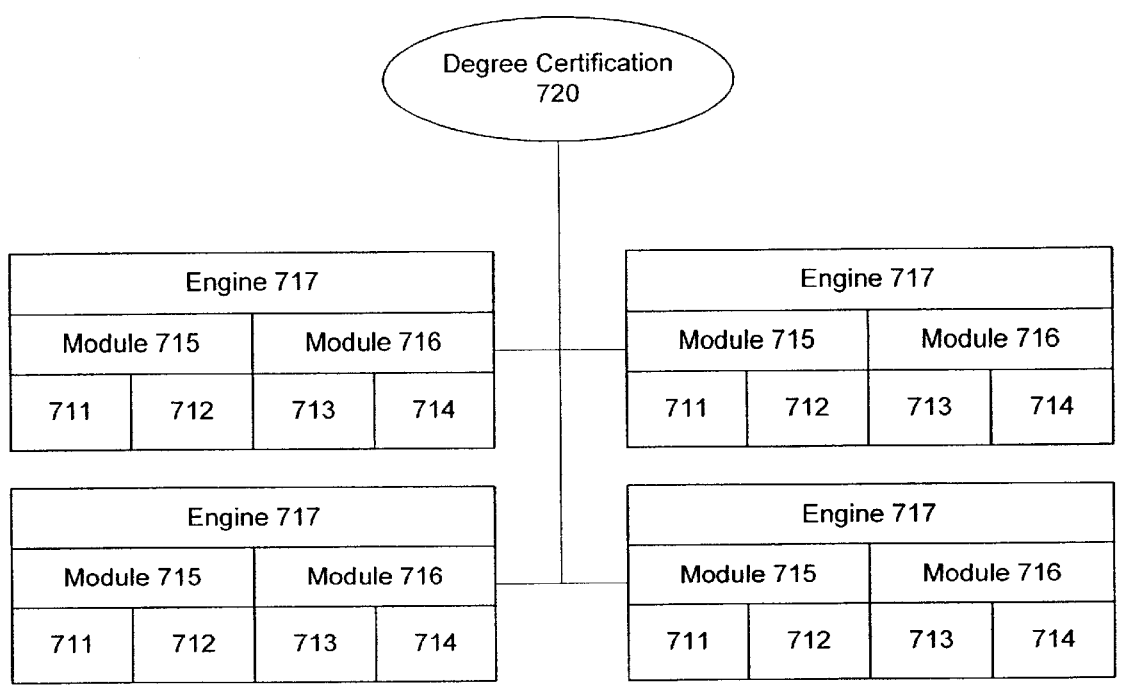
FIG. 7 illustrates an architecture of knowledge elements, software modules, learning engines and degree certification.

Referring now to FIG. 7, application software modules 715–716 operative with the processor 101 can be developed into a learning engine 717. A learning engine can contain material equivalent to one course. Elements 711–714 in turn can make up learning modules 715–716. Each learning engine 717 can include multiple modules 715–716. Individual modules can be edited as a course becomes more refined over time, or as content changes with new scientific discoveries without disturbing the entire application. In one embodiment, a module can be accessed from more than one learning engine. In addition, alternative learning modules can be referenced to adapt and remediate to a particular learners needs 513. Completion of required learning modules can lead to certification with the granting of an online degree 720.

In addition to learning engines, this invention can utilize real time team exercises facilitated through the communications network 200. Multimedia team exercises via the network 200 can force learners to work collectively and cooperatively during the performance of projects. These exercises provide personal interactions and simultaneously teach virtual teaming, an additional skill useful in a business or other environment. The combination of a learning engine and a real time team exercise can provide a learner with flexibility in scheduling and the benefits of interacting with other learners. For example, an on-line business program can prepare learners to understand and use essential business concepts and, in addition, it can teach the learners to reason and communicate effectively using those concepts.

Periodically, learners can engage in synchronous group activities that run on a fixed schedule, such as labs. In lab activities, a learner can work with others to synchronize discussions and prepare deliverables to mentors, team members, or other members of the lab. In one embodiment, a learner can participate with a group of approximately 4–6 learners who serve as lab partners.

Learning engine resources, including modules and labs can be presented online through a WEB interface. A network interface device 201–207 can access a resource through the WEB interface. A WEB based interface can include for example, a hypertext markup language (HTML) document presented as a network site and accessible with a uniform resource locator or TCPIP address. Other markup languages may also be utilized such as extended markup language (XML). Through a WEB based interface, such as a My.Campus screen, a learner can communicate with others, create and update an individual work plan, access needed resources, store work, and stay up to date. While online, learners may create work groups with other learners, use a suite of business tools, check with a registrar, or open a library data base. In addition, learners can store a project, present the project to others, or review work of fellow learners.

The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output Software for organizing and delivering information stored on the server computers can include, for example, Learning Space™ by Lotus Development Corporation or Oracle™ database products. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed application-specific integrated circuits (ASICs).

The course content for delivery over the WEB can be developed in conjunction with qualified learning institutions. An institution can provide professors or other institution affiliates to act as consultants in developing course content. In addition the professors can create video clips, audio clips, simulations, animated concepts, multimedia presentations and passive illustrations to be used during the instructional sessions. The institution can act as a quality control agent to insure that course content and delivery retain quality representative of institutions standards.

The course provider can be responsible for degree granting and accreditation. Affiliated institutions can also provide certificates. The certificates can acknowledge successful completion of the modules developed by the affiliated institution.

What is claimed is:

1. A computer communications system for delivering, tracking progression of, assessing work product related to and certifying completion of an educational module pertaining to a particular subject matter accessed by a learner, said educational module comprising a plurality of elements; wherein the system comprises:
   a computer server connected to the computer communications network and accessible via a network access device;
   executable software stored on the server storage medium and executed on demand via the network access device, the software operative with the computer server to cause educational modules comprising a learning engine to display on the network access device, the educational modules providing:
   a means for motivating the learner in a manner being related to said subject matter said educational module;
   a means for subsequently teaching to said learner one of said plurality of said elements of educational module;
   a means for enabling said learner to perform a task online wherein the task is related to said one of said plurality of elements;
   a means for inducing failure by said learner in performing said task thereby causing said learner to learn an additional element of said educational module; and
   a means for evaluating the performance of the task performed online by said learner.

2. The computer communications system of claim 1 further comprising a means, responsive to the evaluation of performance, for explaining said one of said plurality of elements.

3. The computer communications system of claim 2 further comprising a means for assessing said learner's comprehension of the subject matter of the educational module.

4. The computer communications system of claim 3 further comprising a means for certifying that said learner has satisfactorily comprehended the subject matter of said educational module.

5. The computer communications system of claim 1 wherein the task comprises forming a lab team to role play a situation relating to the subject matter of said educational module.

6. The computer communications system of claim 1 wherein the means for motivating comprises a multimedia segment of an expert detailing an actual scenario relating to the subject matter of said educational module.

7. The computer communications system of claim 1 wherein the means for teaching the subject matter comprises an interactive multimedia presentation.

8. The computer communications system of claim 1 wherein the means for evaluating comprises submission of an online cognitive artifact.

9. The computer communications system of claim 1 additionally comprising adaptive assessment and learning software to track the number to attempts a learner makes to satisfactorily complete a task and branch to an alternative learning module when a threshold number of attempts is reached.

10. The computer communications system of claim 9 additionally comprising adaptive assessment and learning software to track the amount of time that transpires during which a learner accesses a module and branching to an alternative learning module when a threshold amount of time is reached.

11. The computer communications system of claim 1 further comprising a means for inducing failure by said learner in performing said task thereby causing said learner to learn an additional element of said educational module.

12. A method of instructing a learner via a computer communications network, the method comprising:
   presenting a software education module to said learner via the computer communications network, said software education module pertaining to a particular subject matter;
   proving motivational material to the learner wherein the motivational material relates to the education module;
   subsequently providing to said learner material for teaching said subject matter;

enabling said learner to perform an online task relating to the subject matter;

evaluating the learner's performance of the online task;

providing material responsive to the evaluation of the performance of the online task, said material being provided online and directed to explaining the subject matter of the module;

assessing the learner's comprehension of the module subject matter;

inducing failure by said learner in performing said task thereby causing said learner to learn an additional element of said educational module; and certifying that said learner has satisfactorily comprehended the subject matter.

13. The method of claim 12 additionally comprising the steps of:

tracking the number of attempts the learner makes to satisfactorily complete a task and branching to an alternative module when a threshold number of attempts is reached.

14. The method of claim 12 additionally comprising the steps of:

tracking the amount of time that transpires during which the learner accesses a module and branching to an alternative learning module when a threshold amount of time is reached.

15. The method of claim 12 further comprising the step of:

inducing failure by said learner in performing said task thereby causing said learner to learn an additional portion of said subject matter.

16. Computer executable program code residing on a computer-readable medium, the program code comprising instructions for causing the computer to:

access a software education module via the computer communications network;

execute a software element providing motivational material to the learner, the material relating to the education module;

subsequently provide material to facilitate understanding by the learner of the subject matter comprising the module;

perform an online task relating to the subject matter comprising the module;

evaluate the performance of the online task;

provide material responsive to the evaluation of performance of the online task, said material being provided online and directed to explaining the subject matter of the module;

assess the learner's comprehension of the module subject matter;

induce failure by said learner in performing said task thereby causing said learner to learn an additional element of said educational module; and certify satisfactory comprehension of the module subject matter.

17. The computer executable program of claim 16 wherein the program code additionally causes the computer to:

track the number of attempts the learner makes to satisfactorily complete a task and branch to an alternative learning module when a threshold number of attempts is reached.

18. The computer executable program of claim 16 wherein the program code induces failure by said learner in performing said task thereby causing said learner to learn an additional element of said subject matter.

19. A method of interacting with a computer communications network so as to provide instruction to a learner comprising the steps of:

accessing a server with a network access device over the computer communications network;

executing a software program comprising a learning engine, the learning engine causing an education module to be presented to the learner; and interacting with the network access device such that the module will present motivational material to the learner, subsequently facilitate understanding of the subject matter, permit the learner to perform a task online, evaluate the online task, respond to mistakes frequently made in performing the online task, assess the learner's comprehension of the subject matter, induce failure by said learner in performing said task thereby cause said learner to learn an additional element of said educational module and certify satisfactory comprehension of the module.

20. The method of claim 19 additionally comprising the steps of:

tracking the number of attempts the learner makes to satisfactorily complete a task and branching to an alternative learning module when a threshold number of attempts is reached.

21. A computer data signal embodied in a digital data stream comprising data including education modules, wherein the computer data signal is generated by a method comprising the steps of:

presenting motivational material to the learner, the material relating to the education module;

subsequently presenting material to facilitate understanding by the learner of subject matter comprising the module;

performing an online task relating to the subject matter comprising the module;

evaluating, via a software element, the performance of the online task;

providing material responsive to the evaluation of performance of the online task, said material being provided online and directed to explaining the subject matter of the module;

assessing the learners comprehension of the module subject matter;

inducing failure by said learner in performing said task thereby causing said learner to learn an additional element of said educational module; and certifying satisfactory comprehension of the module subject matter.

22. The computer data signal as in claim 21 wherein the signal is further generated by a method comprising the additional steps of:

tracking the number of attempts the learner makes to satisfactorily complete a task and branching to an alternative learning module when a threshold number of attempts is reached.

* * * * *

UNITED STATES PATENT AND TRADEMARK OFFICE
CERTIFICATE OF CORRECTION

PATENT NO.    : 6,301,462 B1
DATED         : October 9, 2001
INVENTOR(S)   : Freeman et al.

It is certified that error appears in the above-identified patent and that said Letters Patent is hereby corrected as shown below:

<u>Column 10,</u>
Line 64, "proving" should read -- providing --.

Signed and Sealed this

Fourteenth Day of May, 2002

*Attest:*

JAMES E. ROGAN
*Attesting Officer*    *Director of the United States Patent and Trademark Office*